(12) United States Patent
Furusawa et al.

(10) Patent No.: US 6,468,148 B1
(45) Date of Patent: Oct. 22, 2002

(54) EXHAUST VENTILATOR

(75) Inventors: Yasuhide Furusawa, Lebanon, KY (US); Daiichiro Kawashima, Ichinomiya; Hiroshi Mukai, Hashima, both of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/421,692

(22) Filed: Oct. 20, 1999

(30) Foreign Application Priority Data

Oct. 20, 1998 (JP) .......................................... 10-298461

(51) Int. Cl.⁷ ................................................. B60H 1/24
(52) U.S. Cl. ........................ 454/164; 454/162; 137/858
(58) Field of Search ................................ 454/165, 164, 454/162; 137/858, 855

(56) References Cited

U.S. PATENT DOCUMENTS 5,355,910 A * 10/1994 Gies et al. ................. 137/858
5,579,697 A * 12/1996 Burke ......................... 105/355
6,001,906 A * 12/1999 Golumbic ................... 524/104

FOREIGN PATENT DOCUMENTS

| JP | 9-24729 | 1/1997 | | |
| JP | 9024729 | * 1/1997 | .................. | 454/41 |

* cited by examiner

*Primary Examiner*—Harold Joyce
*Assistant Examiner*—Derek S. Boles
(74) *Attorney, Agent, or Firm*—Pillsbury Winthrop LLP

(57) ABSTRACT

An exhaust ventilator has a frame on which an opening is formed. The frame is composed of a main frame and a flange. Partitions divide the opening of the frame into a plurality of air vents in a matrix manner. Butterfly valves of plate shape have their upper end fixed to the partitions. Lower portions of the butterfly valves are able to open and close the air vents. The frame, partitions and butterfly valves are made of the same olefinic material. Thus, they can be recycled without disassembling.

14 Claims, 7 Drawing Sheets

EXHAUST VENTILATOR

BACKGROUND OF THE INVENTION

1. Field of the Invention

This invention relates to an exhaust ventilator having a plate-shaped butterfly valve that is mounted on a frame to open and shut off a vent port formed on the frame. Particularly, it relates to an exhaust ventilator disposed on an automobile and having an improvement in a structure at an exit or outlet port for enabling an air to be exhausted from a cabin to an outside of the automobile.

2. Description of the Related Art

As a conventional exhaust ventilator, a quarter ventilator is disposed on a lateral rear side of a rear bumper of an automobile. The quarter ventilator has a plate-shaped butterfly valve, which is mounted on a frame having a vent port. The quarter ventilator permits an outside air to be introduced into a cabin through an air vent of an instrument panel. Moreover, the introduced air passed through the cabin and is exhausted via the quarter ventilator.

FIG. 5 shows an automobile on which an exhaust ventilator is provided. FIG. 6 shows a main portion, partially cut away, of a conventional exhaust ventilator. FIG. 7 shows a section of the conventional exhaust ventilator. The conventional art is disclosed in Japanese Laid Open Patent Publication 9-24729.

Referring to FIGS. 5 to 7, an opening 12 is formed at a rear lateral part 11 of a body of an automobile 1. Specifically, the opening 12 is disposed at an inside of a rear bumper 2 as shown in FIG. 5. An exhaust ventilator is provided in such opening.

A conventional exhaust ventilator has a main frame 113 that has a shape of short square pipe and that defines an outline of an overall structure of the exhaust ventilator. A flange 114 is formed at an outer end of the main frame 113. The flange 114 has a square ring shape that extends in a radially outward direction. The flange 114 has holes for inserting screws 115 so that it is fixed on the body lateral part 11 of the automobile 1 by the screws 115.

The main frame 113 has four inside surfaces: an inside upper surface 113a, inside lower surface 113b, inside left surface (not shown) and inside right surface 113d. The conventional exhaust ventilator has an upper partition 116a and lower partition 116b. The upper partition 116a and lower partition 116b are parallel to the upper surface 113a and lower surface 113b, respectively, and divide a space between the upper and lower surfaces 113a and 113b at equal intervals. The exhaust ventilator further has a left partition (not shown) and a right partition 116d. The left partition and right partition 116d are parallel to the left surface and a right surface 113d, respectively, and divide a space between the left and right surfaces 113d at equal intervals. The upper partition 116a, lower partition 116b, left partition and right partition 116d are crossed to each other. Thus, nine air vents 130 are formed. The air vents 130 have an equal opening area.

Moreover, the outer end surfaces 116A of the partitions 116a, 116b, 116d are protruded longer toward an outside one by one as they go down. The outer end surfaces 116A are positioned on an imaginary line Z shown by one-dot-chain line in FIG. 6, which is inclined at an angle α=60 degrees.

A butterfly valve 118 has an upper side secured to an inside stepped part of the upper surface 113a of the main frame 113 so that it closes the corresponding air vents 130. Similarly, butterfly valves 118 have upper sides secured to lower half part of outer end surfaces 116A of the upper and lower partitions 116a and 116b, respectively, so that they close the corresponding air vents 130. The butterfly valves 118 are fixed by screws 120 via pressure pieces 119. Each of the butterfly valves 118 has its lower side tiltable. The pressure piece 119 has such rigidity that it uniformly transmits a pressure from the screw 120 to each butterfly valve 118. Moreover, the pressure piece 119 has a vertical surface and an inclined surface. A head of the screw 120 is disposed on the vertical surface, and the inclined surface is in close contact with the outer end surface 116a. Thus, the pressure of the screws 120 is evenly transferred to the outer end surface 116a. The butterfly valve 118 is formed of a flexible material composed of EPDM such as a solid rubber sheet having a predetermined mass.

As mentioned above, the butterfly valves 118 are disposed over the air vents 130, respectively. The outer end surfaces 116A of the left and right partitions 116d are aligned on the imaginary line Z. The main frame 113 has inside stepped surfaces on the inside left surface and inside right surface 113d, respectively. Such stepped surfaces are disposed on the imaginary line Z of the angle α=60 degrees. Thereby, each butterfly valve 118 has its inside surface planarly contacted with the end surfaces 116A of the left and right partitions 116d and the stepped surfaces of the left and right surfaces 113d when the air in the cabin is not ventilated. Moreover, the main frame 113 has an inside stepped surface on the upper surface 113a. Such stepped surface is disposed on the imaginary line Z of the angle α. The entire outer end surface 116A of the lower surface 113a is disposed on the imaginary line Z of the angle α=60 degrees. Thereby, each butterfly valve 118 has its inside surface planarly contacted with the entire outer end surface 116A of the lower surface 113b when the air in the cabin is not ventilated. Moreover, the air in the cabin flows out of gaps formed between them or through the air vents 130.

The conventional exhaust ventilator constructed as above operates as follows.

When ventilation is necessary in the cabin of the automobile 1, an outside air is introduced into the cabin, for example, via an instrument panel. Then, an air pressure in the cabin increases. Accordingly, each butterfly valve 118 on each air vent 130 has its lower end moved outward, thereby forming a fixed gap. Thus, the inside air is exhausted to the outside through between the inside surfaces of the butterfly valves 118, the upper partition 116a, lower partition 116b and lower surface 113a of the main frame 113. At this time, the butterfly valve 118 opens in such a degree as to balance with the inside air pressure. When the inside air is not ventilated, the butterfly valve 118 closes each air vent 130 by its dead weight.

Consequently, even if the outside air pressure of the automobile 1 heightens, the butterfly valve 118 is never opened. Moreover, if a water pressure is applied from the outside when washing the car, the butterfly valve 118 keeps its closing state. Furthermore, since the water attached to an outside surface of the butterfly valve 118 can flow downward, the water during car wash never flows into the cabin.

To the contrary, the butterfly valve 118 maintains the closing state not by pressure by its elastic force but only by the dead weight. Therefore, there is no change in its elastic modulus by aged deterioration, so that it can operate stably. As a result, pressure loss due to the butterfly valve 118 decreases at the air vent 130, thereby enabling ventilation of the inside air with a little pressure difference.

However, when recycling as resource, the conventional exhaust ventilator needs to be disassembled into each part and classified into each material. Namely, it must have all the parts divided: the screws 115 at the flange 114, main frame 113, butterfly valve 118 of EPDM, pressure piece 119 and metal screws 120.

BRIEF SUMMARY OF THE INVENTION

An object of the present invention is to provide an exhaust ventilator that has all parts made of a same material so as to enable recycle of resource, while keeping or improving its property.

According to a first aspect of the invention, an exhaust ventilator is provided. The exhaust ventilator has a frame. The frame has an opening for ventilating an air in a cabin of an automobile. A partition divides the opening of the frame into a plurality of air vents so as to separate an airflow in the cabin through the air vents. A butterfly valve of a plate shape has an upper end fixed to the partition so that a lower side of the butterfly valve is able to open and close the air vents. The frame, partition and butterfly valve are made of an olefinic thermoplastic material.

With such features, the frame, partition and butterfly valve can be integrally recycled without disassembling them. Thus, the inventive exhaust ventilator is preferable to recycling. Particularly, the butterfly valve of olefinic thermoplastic material exhibits excellent advantageous effects, even if airflow is small from the inside to the outside of a cabin.

An exhaust ventilator may further has a sealant for joining the frame to a body of the automobile. The sealant is made of an olefinic thermoplastic material.

The partition may divide the opening of the frame vertically and horizontally so as to arrange the air vents in a matrix manner. Each of the air vents has an aspect ratio of 1 to 1±0.5.

Each of the air vents may have an opening area of 15 to 20 cm$^2$.

The partition may have a lower portion protruded longer toward an outside than an upper portion so that an imaginary line connecting the upper portion and the lower portion extends at an angle of 50 to 70 degrees in relation to a horizontal plane and so that the butterfly valve also extends at an angle of 50 to 70 degrees in relation to a horizontal plane.

The butterfly valve may be fitted to the frame by a thermally deformed caulk. The caulk is made of an olefinic thermoplastic material.

The olefinic thermoplastic material may be selected from the group consisting of an olefinic thermoplastic elastomer, a styrene thermoplastic elastomer and a mixed material of an olefinic thermoplastic elastomer and a styrene thermoplastic elastomer.

Further objects and advantages of the invention will be apparent from the following description, reference being had to the accompanying drawings, wherein preferred embodiments of the invention are clearly shown.

DETAILED DESCRIPTION OF THE INVENTION

One embodiment of the invention is described in detail hereunder referring to the attached drawings, wherein the invention is practiced into a ventilation system in a cabin of an automobile.

Figure 1:
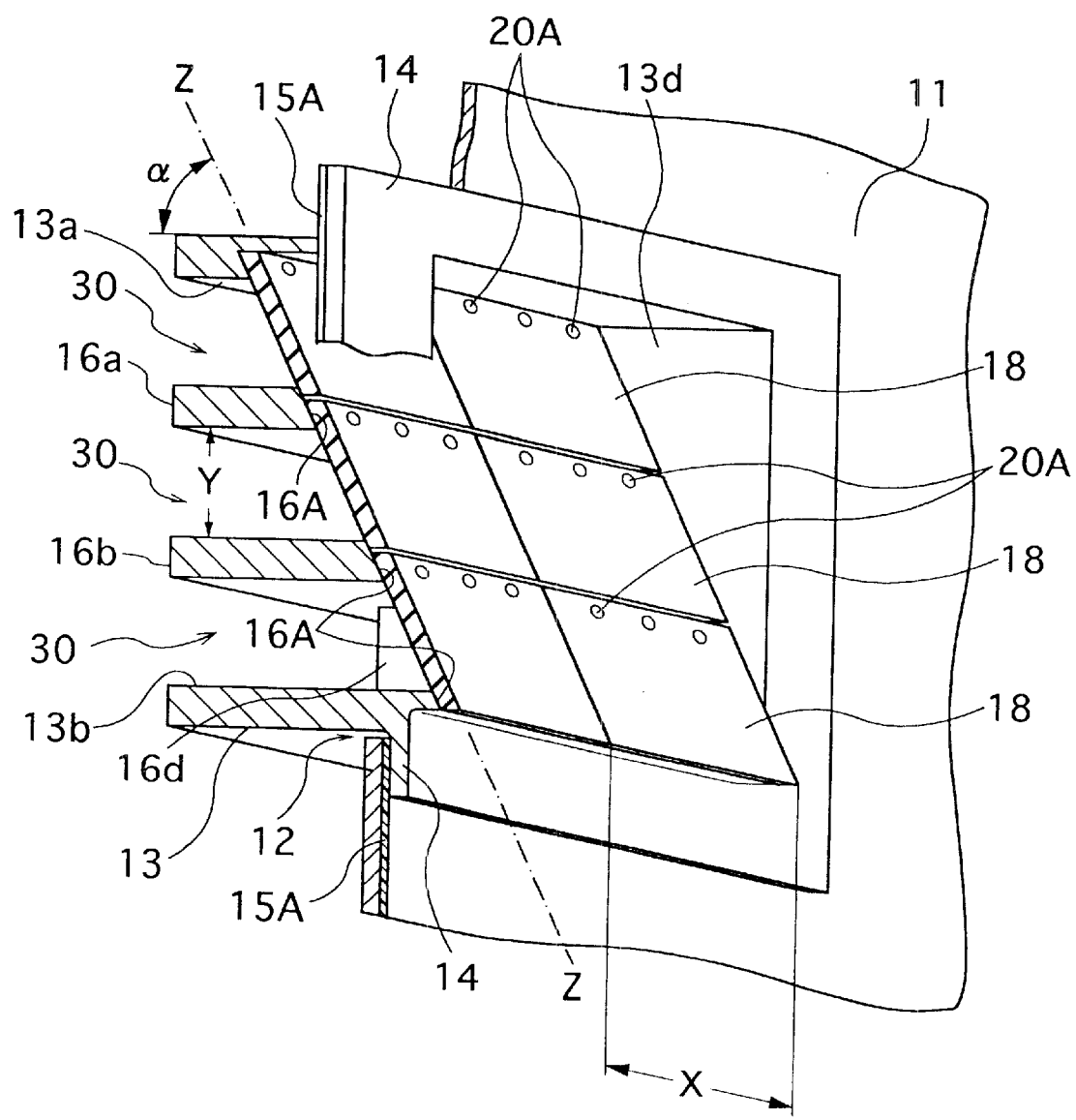
FIG. 1 is a perspective view showing a main portion, cut away in part, of an exhaust ventilator of one embodiment of the invention.
Figure 2:
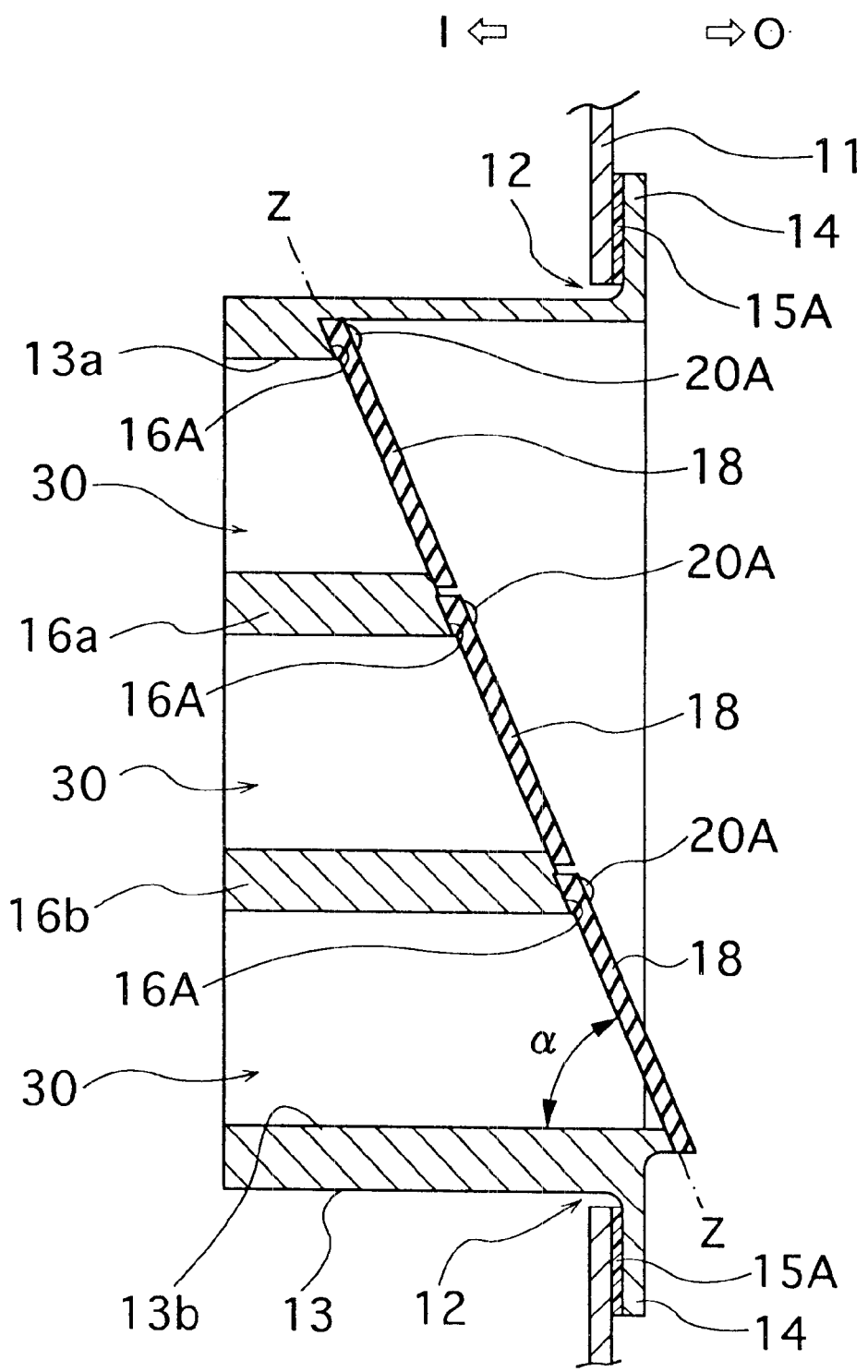
FIG. 2 is a sectional view showing a main portion of an exhaust ventilator of one embodiment of the invention.
Figure 3:
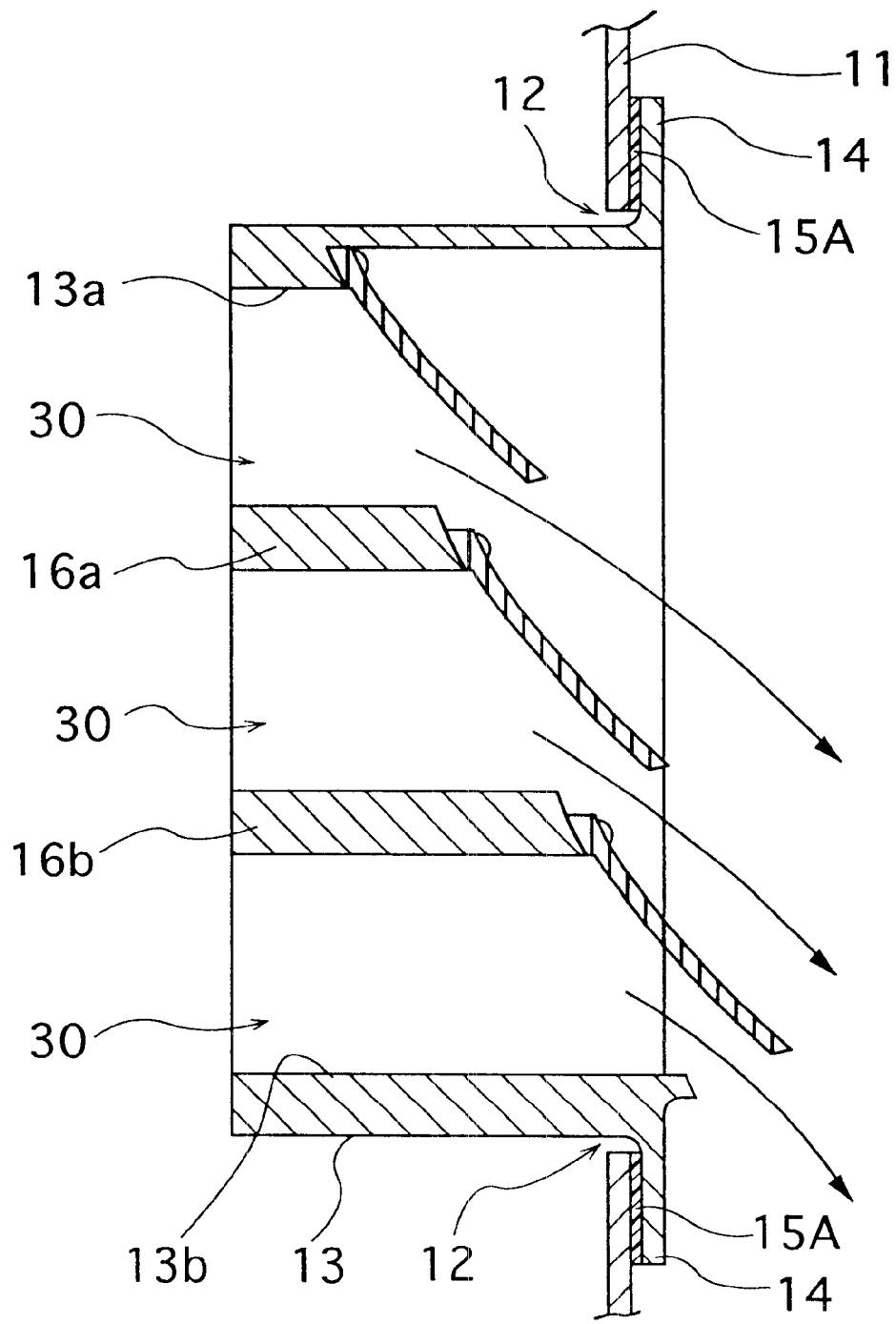
FIG. 3 is a sectional view showing a main portion of an exhaust ventilator under ventilating condition of one embodiment of the invention.

FIG. 1 shows a main portion, cut away in part, of an inventive exhaust ventilator according to one embodiment. FIG. 2 shows a section of the main portion of the inventive exhaust ventilator. FIG. 3 shows a section of the main portion of the inventive exhaust ventilator under ventilating condition.

The embodiment of the exhaust ventilator has the same structure of ventilating system as that of the conventional one. Namely, the embodiment of exhaust ventilator is disposed at a rear side of an automobile 1 and an inside air is exhausted outward via an air vent of the ventilator. Throughout the drawings, the same reference character is attached to the same or corresponding element as the conventional one.

Referring to FIGS. 1 to 3 and FIG. 5, the inventive exhaust ventilator is fitted in the opening 12 at the rear lateral part 11 of the car body as in the conventional art. The exhaust ventilator has a main frame 13 that is made of an olefinic thermoplastic resin material into a short square pipe. Particularly, the main frame 13 is made of a polypropylene and defines an overall profile of the exhaust ventilator. A flange 14 of square ring shape is formed at an outer end of the main frame 13 so as to extend radially outward. The main frame 13 and flange 14 are integrally molded and the flange 14 is made of the same olefinic thermoplastic resin material into a short square pipe. Specifically, the flange 14 is connected to the lateral rear part 11 of the body via a sealant 15A that is made of a PP (polypropylene) foam. While the sealant 15A has an expansion ration of 30% in the embodiment, it is not limited to such percentage in practicing the invention. However, the sealant 15A of the expansion ratio of 30% is advantageous in that it serves as a cushion and prevents mechanical interference, for example. As long as the sealant 15A is peelable, its material is not limited to the olefinic thermoplastic resin.

The main frame 13 has four inside surfaces: an inside upper surface 13a, inside lower surface 13b, inside left surface (not shown) and inside right surface 13d. The exhaust ventilator has an upper partition 16a and lower partition 16b. The upper partition 16a and lower partition 16b are parallel to the upper surface 13a and lower surface 13b, respectively, and divide a space between the upper and lower surfaces 13a and 13b at equal intervals. The exhaust ventilator further has a left partition (not shown) and a right partition 16d. The left partition and right partition 16d are parallel to the left surface and a right surface 13d, respectively, and divide a space between the left and right surfaces 13d at equal intervals. The upper partition 16a, lower partition 16b, left partition and right partition 16d are crossed to each other. Thus, nine air vents 30 are formed. The air vents 30 have an equal opening area. The opening area means an area taken along a vertical plane that perpendicularly crosses the upper surface 13a and lower surface 13b or left surface and right surface 13d.

A vertical interval Y of the opening area is determined by positions of the upper partition 16a and lower partition 16b. A horizontal interval X of the opening area is determined by positions of the left partition and right partition 16d. In this embodiment, an aspect ratio, which is a ratio (Y/X) between the former and the latter, is set in the range of 1 to 1±0.5 so as to lessen pressure loss of the air passing through the air vents 30. Usually, the opening area of the air vent 30 is set in the range of 10 to 30 cm$^2$. However, according to an experiment of the inventors, it was found that the pressure loss was low in the range of 15 to 20 cm$^2$ and that such range was preferable. While the opening 12 is divided into three lines and three rows to define nine air vents 30, the number of divisions is not limited in the invention as long as the opening 12 is divided in plurality.

Moreover, the partitions 16a, 16b, 16d have their outer ends protruded toward the outside, while becoming longer step by step as they go down. The outer ends and the outer end surfaces 16A are lined along an imaginary line Z shown by one-dot-chain line in FIG. 1. The imaginary line Z is inclined at an angle α or about 60 degrees in relation to a horizontal plane of the lower surface 13b. According to an experiment of the inventors, it was confirmed that the pressure loss was low in the range of 50 to 70 degrees in relation to the horizontal plane and that such range was practical. In the present embodiment, the outer end surfaces of the partitions 16a, 16b, 16d are positioned on the imaginary line Z of the inclination α=60 degrees.

Protrusions are formed at an inside stepped part of the upper surface 13a and the outer end surfaces 16A of the main frame 13 when molding the main frame 13. A butterfly valve 18 has an upper side secured to the inside stepped part of the upper surface 13a of the main frame 13 by thermally deforming the protrusions into caulks 20A so that it closes the corresponding air vent 30. Similarly, butterfly valves 18 have upper sides secured to lower half part of outer end surfaces 16A of the upper and lower partitions 16a and 16b by thermally deforming the protrusions into caulks 20A, respectively, so that they close the corresponding air vents 30. Each of the butterfly valves 18 has its lower side tiltable. The caulks 20A press and fix the butterfly valve 18 at a uniform pressure to a portion of the outer end surfaces 16A.

The butterfly valve 18 is disposed on each air vent 30. The butterfly valve 18 is 0.3 mm thick and made of an olefinic thermoplastic resin material having a specific gravity of 0.89. It is preferably formed of an olefinic thermoplastic elastomer.

The olefinic material usable in the butterfly valve 18 in the embodiment may be one of the olefinic thermoplastic elastomer, styrene thermoplastic elastomer and a mixture thereof.

The conventional butterfly valve 118 has a thickness of 0.3 mm and a specific gravity of about 1.25. Compared with the conventional one, the butterfly valve 18 of the embodiment decreases its weight by approximately 71.2%.

According to an experiment of the inventors, if the butterfly valve 18 is made of EPDM in a thickness of 0.21 mm, its weight is approximately equal to one made of an olefinic material having a thickness of 0.3 mm and a specific gravity of 0.89. However, it is noticeable that the EPDM butterfly valve is warped at the time of blanking or thermally deformed. Thus, it exhibits poor sealing properties and cannot be practiced. Other materials were examined, however, it was found that an olefinic thermoplastic material having a specific gravity of approximately 0.89±0.3 is preferable in terms of machinability and sealing characteristics. Of course, it was found that, if the main frame 13 and partition 16a, 16b, 16d were made of an olefinic thermoplastic material, they were also given mechanical strength for standing an aged deterioration.

Moreover, if the butterfly valve 18 is formed of the olefinic thermoplastic material of the specific gravity of approximately 0.89±0.3 exhibited excellent results even where a flow rate from the inside to the outside is in the range of low air quantity (100 m$^3$/h or less).

Figure 4:
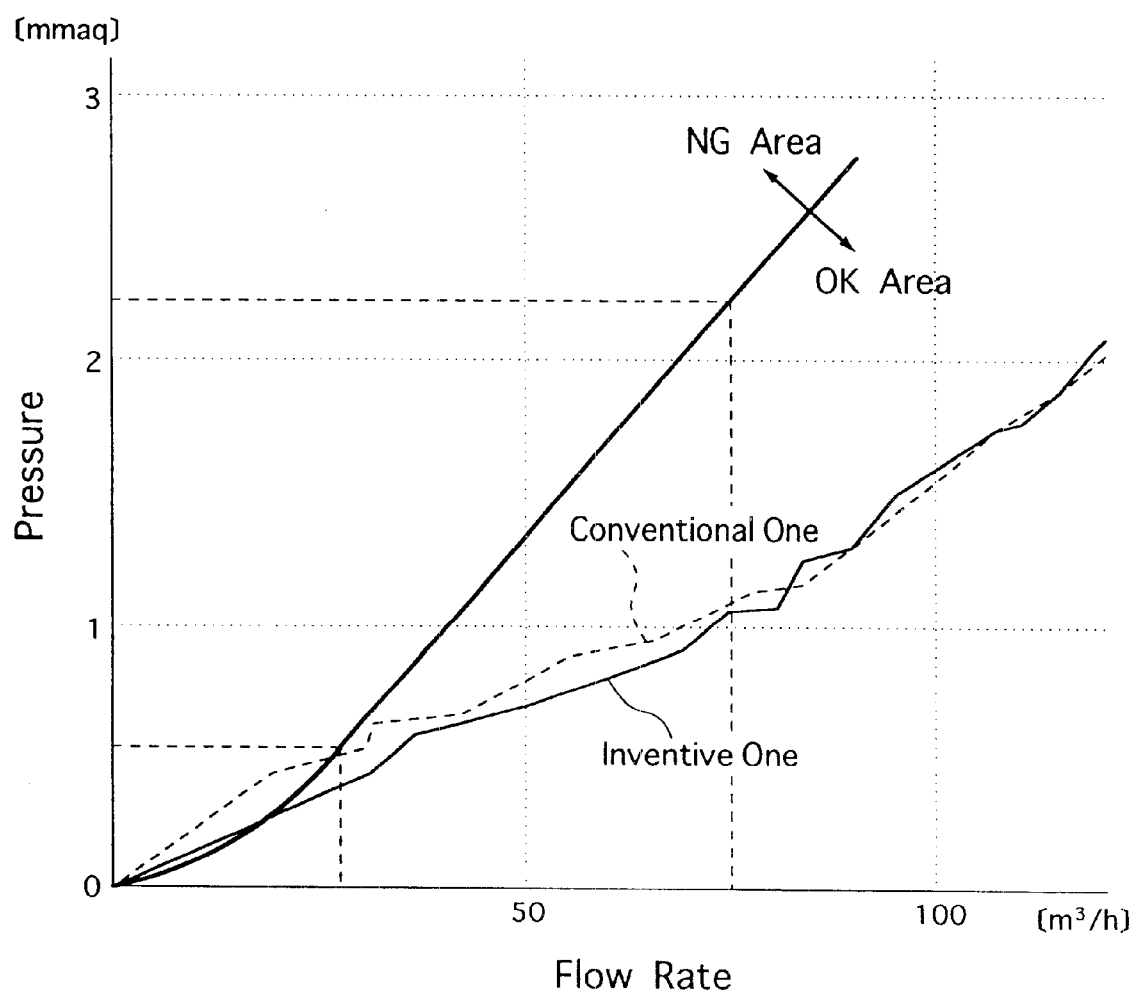
FIG. 4 is a graph showing measured flow rate and pressure loss of an exhaust ventilator of one embodiment of the invention and a conventional one.
Figure 5:
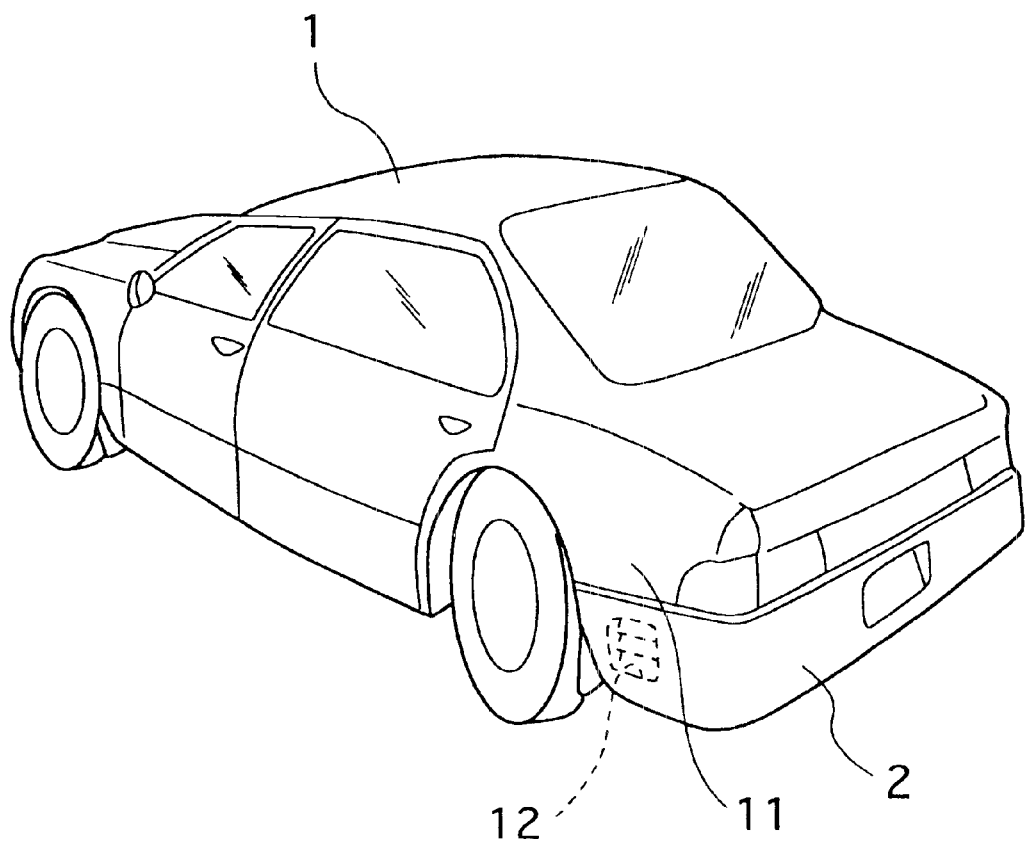
FIG. 5 is a perspective view showing an automobile on which an exhaust ventilator is provided.
Figure 6:
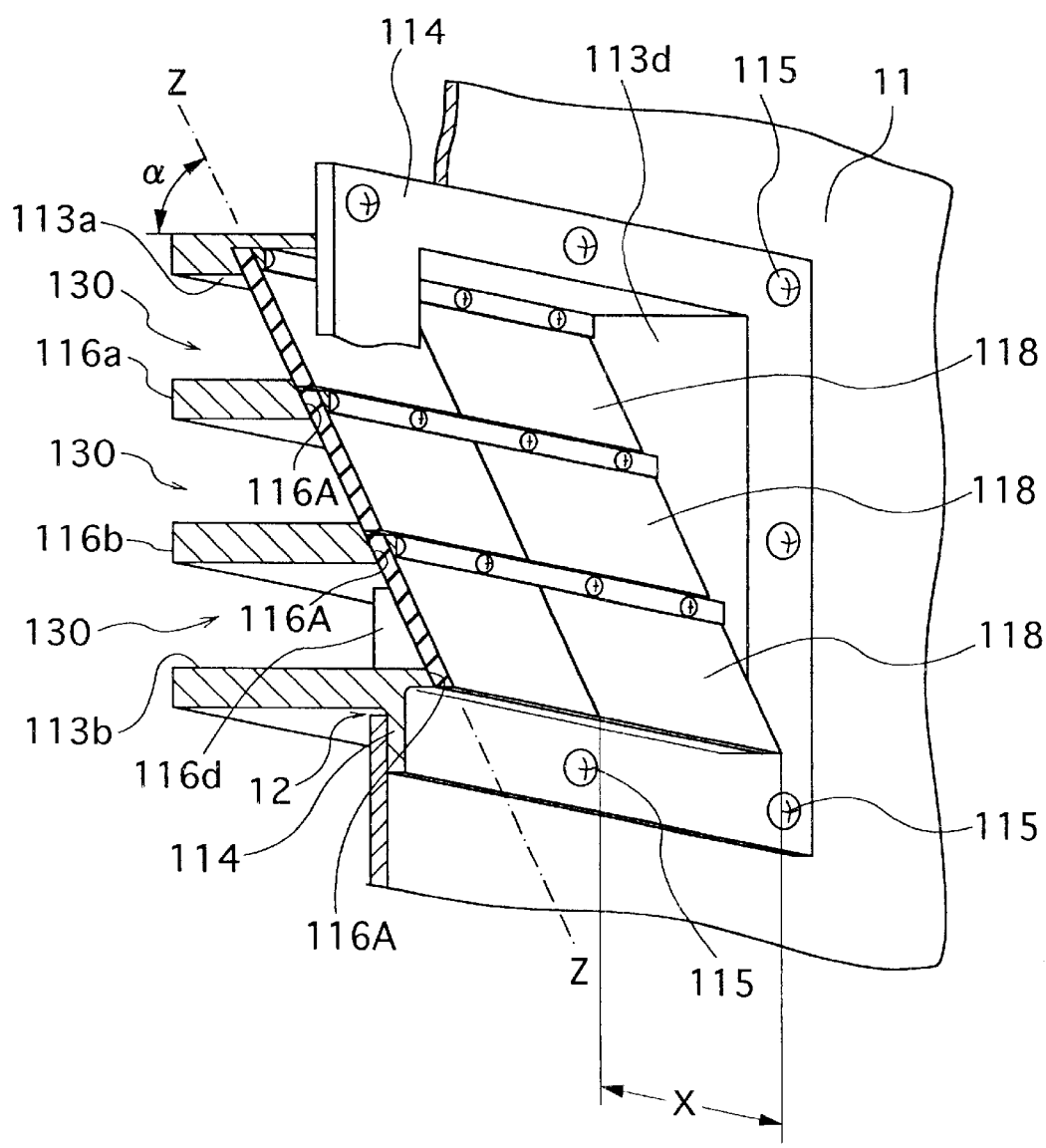
FIG. 6 is a perspective view showing a main portion, cut away in part, of a conventional exhaust ventilator.
Figure 7:
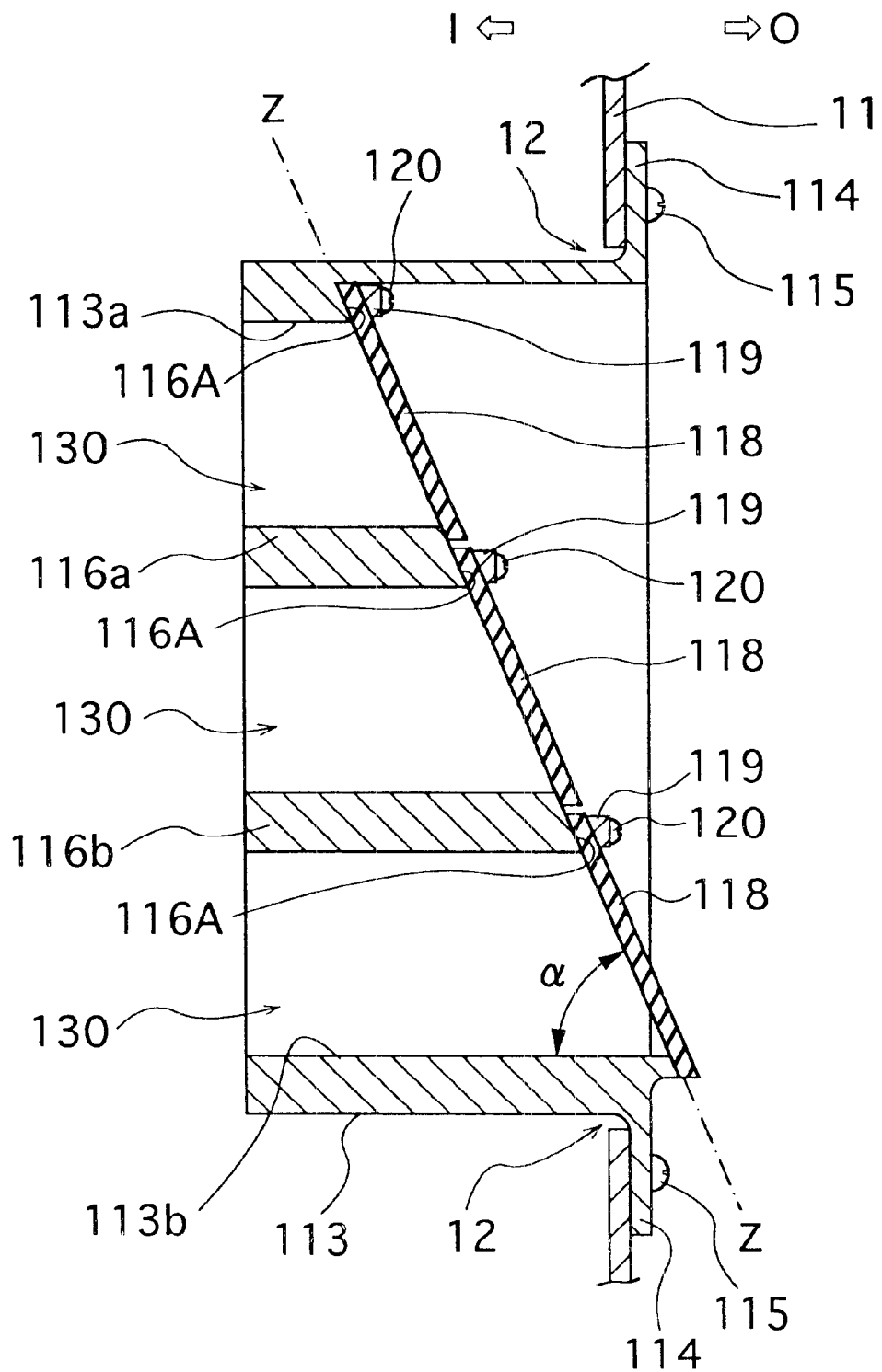
FIG. 7 is a sectional view showing a main portion of a conventional exhaust ventilator.

The inventors carried out a characteristic test for the conventional exhaust ventilator and the inventive one in order to confirm the effects of the present embodiment of invention, as shown in FIG. 4.

FIG. 4 shows measured flow rate and pressure loss of an exhaust ventilator of one embodiment of the invention and a conventional one.

A conventional ventilator in the test has the same basic structure as the inventive ventilator. In this case, measured results of the pressure loss are shown in FIG. 4. It is clear that there are no differences between the conventional ventilator and the inventive one.

Particularly, in a specification of a pressure difference of 0.52 mmaq or less when an air flow is 27 m$^3$/h, the inventive one has a pressure of 0.37 mmaq, while the conventional one has a pressure of 0.47 mmaq. In a specification of a pressure difference of 2.24 mmaq or less when the air flow is 75 m$^3$/h, the inventive one has a pressure of 1.06 mmaq, while the conventional one has a pressure of 1.10 mmaq. It is found that both have lower values than an allowable value, which is required for common ventilators.

The outer end surfaces 16A of the left and right partitions 16d are aligned on the imaginary line Z. The main frame 13 has inside stepped surfaces on the inside left surface and inside right surface 13d, respectively. Such stepped surfaces are disposed on the imaginary line Z of the angle α. Thereby, each butterfly valve 18 has its inside surface planarly contacted with the end surfaces 16A of the left and right partitions 16d and the stepped surfaces of the left and right surfaces 13d when the air in the cabin is not ventilated. Moreover, the main frame 13 has an inside stepped surface on the upper surface 13a. Such stepped surface is disposed on the imaginary line Z of the angle α. The entire outer end surface 16A of the lower surface 13b is disposed on the imaginary line Z of the angle α. Thereby, each butterfly valve 18 has its inside surface planarly contacted with the entire outer end surface 16A of the lower surface 13b when the air in the cabin is not ventilated. Moreover, the air in the cabin flows out of gaps formed between them or through the air vents 30.

The exhaust ventilator of the embodiment constructed as described above operates in the following manner.

When ventilation is necessary in the cabin of the automobile 1, an outside air is introduced into the cabin as in the conventional art, for example, via an instrument panel. Then, an air pressure in the cabin increases. Accordingly, each butterfly valve 18 on each air vent 30 has its lower end moved outward, thereby forming a fixed gap. Thus, the inside air is exhausted to the outside through between the inside surfaces of the butterfly valves 18, the upper partition 16a, lower partition 16b and lower surface 13a of the main frame 13. At this time, the butterfly valve 18 opens in such a degree as to balance with the inside air pressure. When the inside air is not ventilated, the butterfly valve 18 closes each air vent 30 by its dead weight.

As described above, the butterfly valve 18 closes each air vent 30 and opens it at a predetermined opening area by the inside air pressure. The butterfly valves 18 are opened to form clearances, respectively, to the outer end surfaces 16A of the upper and lower partitions 16a and 16b, the lower surface 13b of the main frame 13, the outer end surfaces 16A of the left and right partitions 16d, and the outer end surfaces 16a defined at the stepped parts of the left and right side surfaces 13d of the main frame 13.

On the other hand, the butterfly valves 18 are contacted planarly with such surfaces at their closed positions. The butterfly valves 18 keep the air vents 30 closed by their dead weight. The outer end surfaces 16a of the partitions 16a, 16b, 16d and the side surfaces 13a, 13b are inclined at the angle a along the imaginary line Z. Therefore, each butterfly valve 18 has the inside surface planarly contacted with them by its elasticity, even if it is bent by the weight or airflow. Consequently, even if the outside pressure becomes higher than the inside pressure in the automobile 1, the butterfly valve 18 is never opened. Moreover, if a water pressure is applied from the outside when washing the car, the butterfly valve 18 keeps its closing state. Furthermore, since the water attached to an outside surface of the butterfly valve 18 can flow downward, the water, for example, during a car wash never flows into the cabin.

To the contrary, the butterfly valve 18 maintains the closing state not by pressure by its elastic force but only by the dead weight. Therefore, there is no change in its elastic modulus by aged deterioration, so that it can operate stably. As a result, pressure loss due to the butterfly valve 18 decreases at the air vent 30, thereby enabling ventilation of the inside air with a little pressure difference.

In the present embodiment, a plurality of air vents 30 are formed between the four inside surfaces 13a, 13b, 13d and the partitions 16a, 16b, 16d. Therefore, when the air flows outward through the air vents 30, each airflow through each air vent 30 advances substantially in the same direction, as shown in FIG. 3. The airflows interfere with each other when flown out of the air vents 30. Moreover, each airflow running out of each air vent 30 is hard to generate eddy. Thus, even if eddy is generated somehow, it join integrally into the airflow as a main stream so as to be extinguished. As a result, it is possible to make the airflow uniformly in a separated manner through each air vent 30.

In the exhaust ventilator of the present embodiment, a frame is composed of the main frame 13 and the flange 14 and has an opening for exhausting the inside air of the vehicle. One partition is formed by the upper, lower, left and right partitions 16a, 16b, 16d and divides the opening of the frame. The butterfly valves 18 have a plate shape with the upper end fixed to the partition and the lower part disposed in an openable manner. Moreover, the frame 13, 14, partition 16a, 16b, 16d, and the butterfly valves 18 are formed of the olefinic thermoplastic material. Furthermore, the sealant 15a is made of the olefinic thermoplastic material, though another material can be used therefor as long as it is peelable.

Consequently, all the parts are made of the same thermoplastic material and can be recycled integrally. Thus, the inventive exhaust ventilator is suitable for reuse.

The butterfly valve 18 has a lower end part contacted planarly with the end surfaces 16A and keeps each air vent 30 closed by the dead weight, while inclined at the angle α along the imaginary line Z. Therefore, as mentioned above, the butterfly valves 18 keep their planarly contacted state by the elasticity, even if it is curved by the weight or airflow. Moreover, the butterfly valve 18 keep the closing state only by the dead weight (exactly, a vector component decided by the angle α shown by the imaginary line Z). Therefore, the butterfly valve 18 can be easily opened by the air pressure difference overcoming such weight.

While the frame is composed of the main frame 13 and the flange 14 in the embodiment, it is not indispensable to form the main frame 13 and flange 14 into one body in the invention. Moreover, the flange 14 may be omitted.

While the partition is composed of the upper, lower, left and right partitions 16a, 16b, 16d, the partition may have another structure as long as it divides the two-dimensional space in plurality. It is not always necessary to make the divided area equal.

While the butterfly valve 18 is fitted via the caulks 20A, it may be secured by an adhesive composed of an olefinic material. Otherwise, the butterfly valve 18 may be fitted by both the caulks 20A and adhesive. Moreover, it may be fixed by interposing a member for making uniform the pressure of the caulks 20a.

The partition has the lower portion protruded longer toward the outside than the upper portion so that the butterfly valves 18 are arranged substantially in a straight line along the end surfaces 16A so as to close the air vents 30 without ventilation of the cabin. However, it is possible that the butterfly valves 18 cannot be disposed in a line due to some factors in assembling. Therefore, in the invention, the butterfly valves 18 may be disposed substantially at the same angle on the end surfaces 16A of the above constructed partition so as to close the air vents 30 without ventilation of the cabin.

The olefinic thermoplastic material usable in practicing the invention may be an olefinic thermoplastic elastomer, styrene thermoplastic elastomer, and a mixed material of these elastomers. Here, the styrene thermoplastic elastomer or the mixed material is different from the olefinic thermoplastic material in terms of exact definition as materials. However, they can be deemed as basically the same material in terms of characteristics as products. Therefore, the olefinic thermoplastic material herein described includes the styrene thermoplastic elastomer and the mixed material of the olefinic thermoplastic elastomer and the styrene thermoplastic elastomer.

The preferred embodiments described herein are illustrative and not restrictive, the scope of the invention being indicated in the appended claims and all variations which come within the meaning of the claims are intended to be embraced therein.

What is claimed is:

1. An exhaust ventilator comprising:
   a frame having an opening for ventilating air in a cabin of an automobile, said opening including an area of 10 to 30 square centimeters;
   a partition dividing the opening of the frame into a plurality of air vents so as to separate airflow in the cabin through the air vents; and
   a plurality of butterfly valves with a plate shape having upper ends fixed to the frame and the partition at upper sides of the air vents by thermal caulkings, respectively, so that a lower side of each of the butterfly valves is able to open and close each of the air vents;
   wherein the frame, partition, butterfly valves and thermal caulkings comprise an olefinic thermoplastic material, and wherein the specific gravity of the butterfly valves is 0.89±0.3.

2. An exhaust ventilator according to claim 1, further comprising a sealant for joining the frame to a body of the automobile, wherein the sealant comprises an olefinic thermoplastic material.

3. An exhaust ventilator according to claim 1, wherein the partition divides the opening of the frame vertically and horizontally so as to arrange the air vents in a matrix manner, and wherein each of the air vents has an aspect ratio of 1 to 1±0.5.

4. An exhaust ventilator according to claim 3, wherein each of the air vents has an opening area of 15 to 20 cm$^2$.

5. An exhaust ventilator according to claim 1, wherein the partition has a lower portion protruding longer toward an outside than an upper portion so that an imaginary line connecting the upper portion and the lower portion extends at an angle of 50 to 70 degrees in relation to a horizontal plane and so that the butterfly valve also extends at an angle of 50 to 70 degrees in relation to a horizontal plane.

6. An exhaust ventilator according to claim 1, wherein the butterfly valve is fitted to the frame by a thermally deformed caulk, and wherein the caulk comprises an olefinic thermoplastic material.

7. An exhaust ventilator according to claim 1, wherein the olefinic thermoplastic material is selected from the group consisting of an olefinic thermoplastic elastomer, a styrene thermoplastic elastomer and a mixed material of an olefinic thermoplastic elastomer and a styrene thermoplastic elastomer.

8. An exhaust ventilator according to claim 1, wherein the butterfly valve is essentially made of one of an olefinic thermoplastic elastomer, a styrene thermoplastic elastomer and a mixture of the olefinic thermoplastic elastomer and the styrene thermoplastic elastomer.

9. An exhaust ventilator according to claim 1, wherein the frame is essentially made of polypropylene.

10. An exhaust ventilator according to claim 2, wherein the sealant is essentially made of a polypropylene foam.

11. An exhaust ventilator according to claim 1, wherein the butterfly valve is essentially made of one of an olefinic thermoplastic elastomer, a styrene thermoplastic elastomer and a mixture of the olefinic thermoplastic elastomer and the styrene thermoplastic elastomer, and wherein the frame is essentially made of polypropylene.

12. An exhaust ventilator according to claim 2, wherein the butterfly valve is essentially made of one of an olefinic thermoplastic elastomer, a styrene thermoplastic elastomer and a mixture of the olefinic thermoplastic elastomer and the styrene thermoplastic elastomer, and wherein the frame is essentially made of polypropylene, and the sealant is essentially made of a polypropylene foam.

13. An exhaust ventilator for allowing unidirectional air flow from an interior cabin of an automobile to the exterior of the automobile comprising:

a frame having an opening, said opening including an area of within in a range of 10 to 30 square centimeters, said frame ventilating the air in the interior cabin of the automobile;

at least a partition dividing the opening of the frame into a plurality of air vents through which air flows through the cabin to the exterior of the automobile;

a plurality of butterfly valves each with a plate shape having an upper side end and a lower side end, said lower side end of each of the butterfly valves being configured to open and close each of the air vents so as to result in the unidirectional air flow, wherein said lower side ends seal the air vents when closed against a surface portion of said partition; and thermal caulkings for fixing each of said upper side end of each of the butterfly valves to a respective one of the frame and the partition;

wherein the frame, partition, butterfly valves and thermal caulkings comprise an olefinic thermoplastic material, and wherein the specific gravity of the butterfly valves is 0.89±0.3 so that only the weight of the plate shape butterfly valve is sufficient to seal the lower side end of the butterfly valve to the partition.

14. The exhaust ventilator according to claim 13, wherein the surface portion of the partition has an angle at or about 60°.

* * * * *